(No Model.)  3 Sheets—Sheet 1.
J. McLACHLAN.
CAR TRUCK.
No. 280,386.  Patented July 3, 1883.
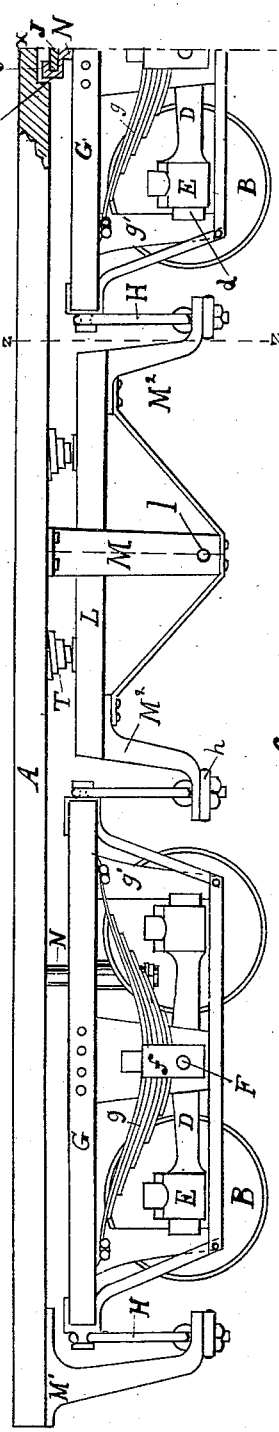
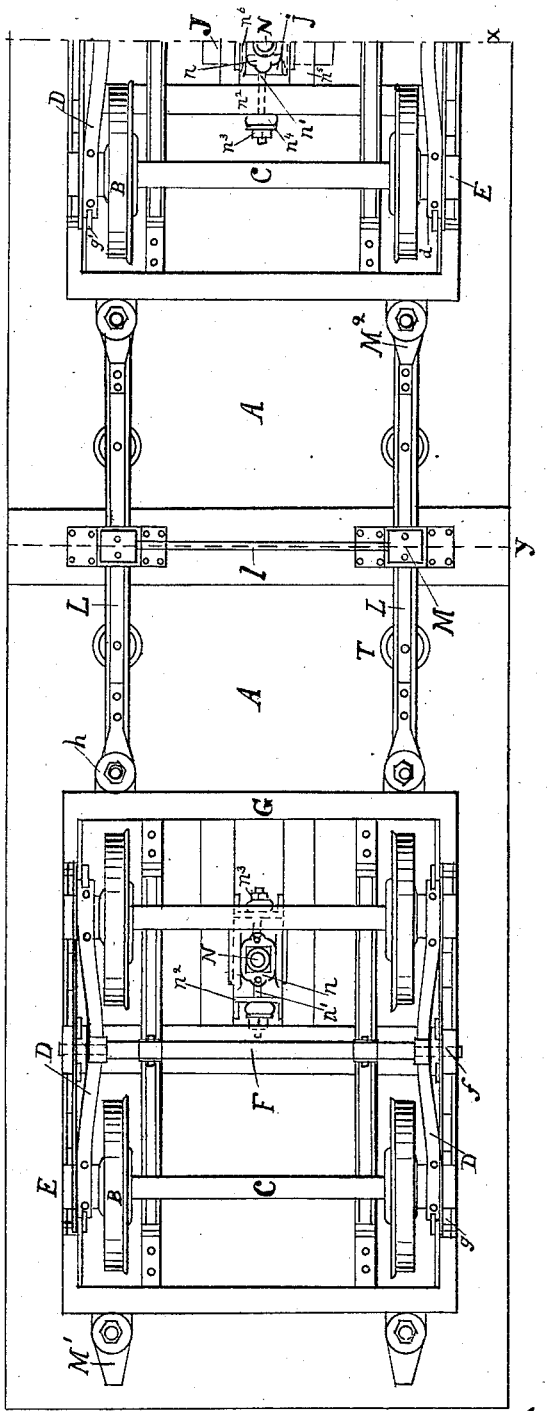
WITNESSES:
INVENTOR: John McLachlan
BY Geo. R. Cutter,
ATTORNEYS:

(No Model.) 3 Sheets—Sheet 2.

J. McLACHLAN.
CAR TRUCK.

No. 280,386. Patented July 3, 1883.

WITNESSES:
W. H. Pope.
S. P. Smith.

John McLachlan,
INVENTOR:
BY Geo. R. Cutler,
ATTORNEYS.

(No Model.) 3 Sheets—Sheet 3.
J. McLACHLAN.
CAR TRUCK.
No. 280,386. Patented July 3, 1883.
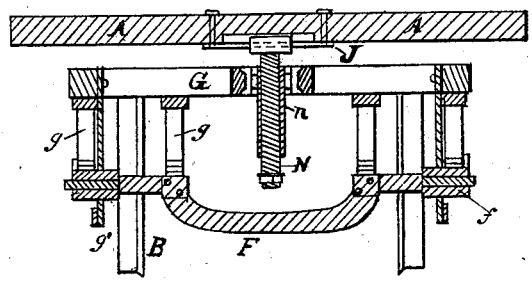
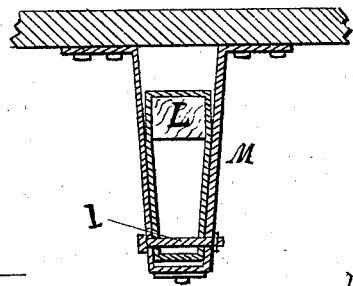
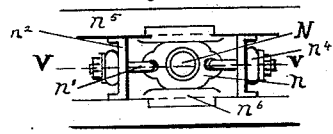
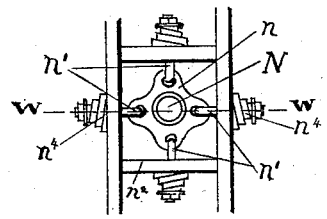
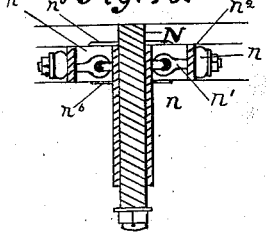
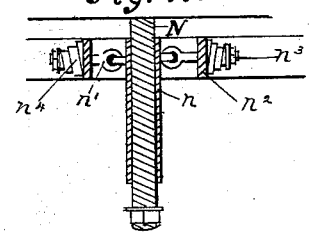
WITNESSES:
W. H. Pope.
S. P. Smith.
John McLachlan,
INVENTOR:
BY Geo. R. Cutler,
ATTORNEYS.

UNITED STATES PATENT OFFICE.

JOHN McLACHLAN, OF CHICAGO, ILLINOIS.

CAR-TRUCK.

SPECIFICATION forming part of Letters Patent No. 280,386, dated July 3, 1883.

Application filed December 14, 1882. (No model.)

*To all whom it may concern:*

Be it known that I, JOHN MCLACHLAN, a subject of the Queen of Great Britain, residing at Chicago, in the county of Cook and State of Illinois, have invented a certain new and useful Improvement in Railway-Cars, of which the following is a specification, reference being made to the accompanying drawings, in which—

Figure 3:
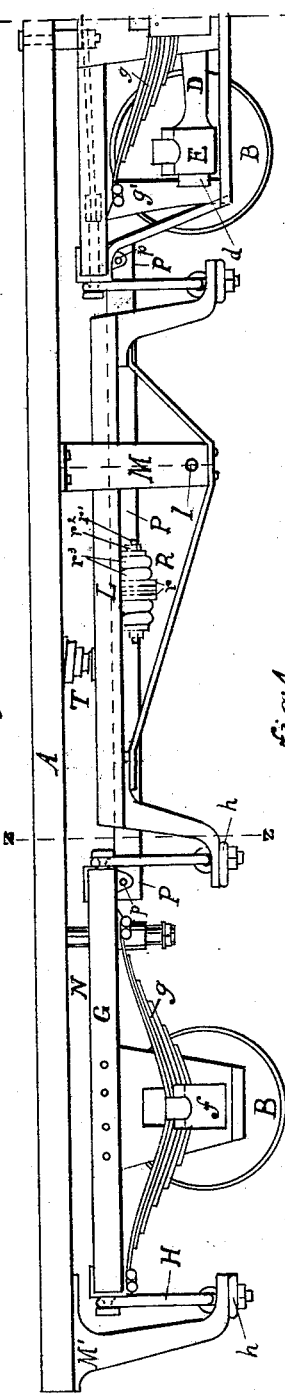
Figure 4:
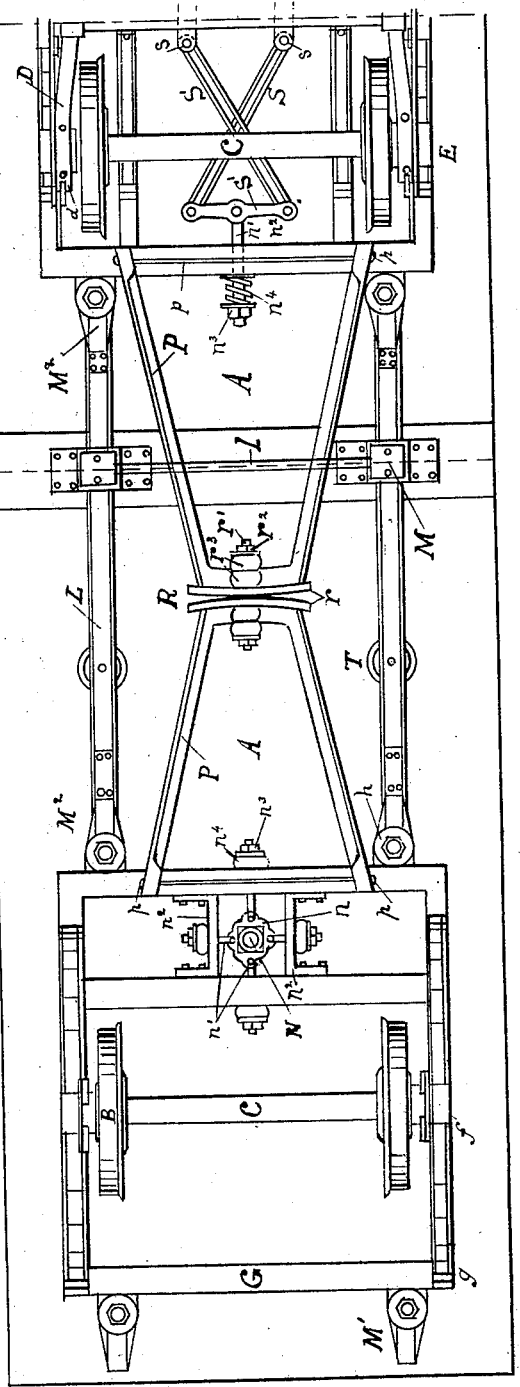

Figure 1 represents, in side elevation, a railway-car embodying my improvements, or rather one half of such a car, the other half being a counterpart of the half shown. Fig. 2 is a bottom plan view thereof, (omitting the secondary axle from the drawings.) Fig. 3 is a side elevation of a modification of the same. Fig. 4 is a bottom plan view thereof. Fig. 5 represents the car as shown in vertical cross-section taken on the line $x\ x$ of Figs. 1 and 2. Fig. 6 is a vertical section on an enlarged scale of one of the supporting-levers and its connections, taken on the line $y\ y$ either of Figs. 1 and 2 or of Figs. 3 and 4. Fig. 7 is a vertical section in detail and on an enlarged scale, taken on the line $z\ z$ of either Fig. 1 or Fig. 3, of one of the links (and its connections) on which the car-body is supported. Fig. 8 shows in detail and in plan view a construction which may be adopted for the parts immediately surrounding the pivots of the end trucks, which construction is also shown in Fig. 2. Fig. 9 shows in detail and in plan view another construction designed for pivoting the trucks, which construction (slightly modified) is also shown in Fig. 4. Fig. 10 is a section taken on the line $v\ v$ of Fig. 8, and Fig. 11 is a section taken on the line $w\ w$ of Fig. 9.

My invention consists of a car having three or more sets of wheels arranged in separate wheel-frames, wherein the end wheel-frames are capable of oscillation in the horizontal plane independently of the car-body, and the end sets of wheels are connected to the car-body through a first-class lever, one end of which supports the car-body through its connection with one end of a second-class lever, and the other end of which first-class lever supports the car-body without such interposition.

My invention further consists of details of construction which will be hereinafter described, and definitely pointed out in the claims.

In the drawings, A represents the base of the body of the car, that part of the body being sufficient to show the connection between the car-body and the wheels.

In Figs. 1 and 2 is shown a car with six pairs of wheels, divided equally among three trucks, which are like each other except as hereinafter specified, which trucks are located, respectively, at the center and each end of the car-body. The construction of these trucks and their connection with the car-body will now be described.

B B, &c., are the wheels, which are united in pairs in the usual manner by axles C. These axles C are united in pairs by side bars, D, terminating in journal-boxes E for the axles. These side bars, D, are united in pairs by a secondary axle, F, on which these side bars are pivoted by their journal-boxes $f$, to allow of their oscillation up and down whenever changes in the plane of the underlying track demand, independently of the superincumbent parts of the car. The side bars are pivoted independently of each other, and they can thus not only together oscillate independently of the superimposed parts of the car, but can also oscillate independently of each other, the axle-journals being fitted loosely enough in their boxes E to admit of this, while at the same time they have a sufficiently long bearing in their boxes to prevent any angular derangement (in the horizontal plane) between the axles and side bars, thus allowing of the uniformly even distribution of the weight of the parts resting on the secondary axle F (and their load) on each of the four wheels of the truck.

On each secondary axle F is mounted the seesaw truck-frame proper, G, by means of the interposed springs $g$, which rest on the journal-boxes $f$.

From each side of each end of each truck-frame G depend links H. Each pair of links between trucks on the same side of the car supports a lever, L, by brackets $M^2$ on the ends thereof, the links forming universal joints between the lever L and the truck-frames G. Each lever L supports the body of the car, being pivoted by a rod, $l$, to a bracket, M, secured to the car-body and depending therefrom, the links at the outer ends of the outer trucks supporting directly brackets M', secured to and depending from the ends of the body of the car on each side.

Having now explained those connections between the body of the car and its wheels by which the former is supported on the latter, whereby a certain desirable amount of vertical relative motion between the car-body and the wheels is regulated, it remains to observe that that relative motion between the car-body and the wheels of the center truck laterally which is required to enable the car to traverse curves is regulated by a slide, J, transverse to the car-body and secured to the under side thereof, which slide is overlapped by lips $j$, projecting inward over said slide J from the flanges $j'$ of the head of the pivot-pin N, which is supported by the said lips $j$ and guided in a direction transverse to the car-body by said flanges $j'$, and which is sheathed in a pivot plate or box, $n$, on the truck-frame G. This plate $n$ and its other connections, being the same as the construction shown in the end truck of Fig. 4, (and in detail in Figs. 9 and 11,) except that the provisions there shown for lateral motion are in Figs 1 and 2 omitted, may conveniently be described as it appears in the first-named figure. As there shown, the box or plate $n$ is rendered susceptible of motion toward either side of the truck-frame G by being connected thereto by rods $n'$, linked to itself, and having play in the directions of their respective lengths through perforations (of somewhat greater diameter than their own, to allow each pair of opposite rods to accommodate themselves to the play of the others) in a bar, $n^2$, of the truck-frame G, within which perforations the play of said rods $n'$ is limited by nuts $n^3$ and regulated by the interposed rubber or other springs, $n^4$.

The above-described construction is modified in the detail views (Figs. 9 and 11) by the substitution of spiral for rubber springs. The construction actually shown in the trucks of Fig. 2 for connecting the pivot-pin N with the running-gear below is also shown in detail in Figs. 8 and 10. This construction dispenses with the rods $n'$ lying transverse to the car, and the plate or box $n$ is guided backward and forward by suitable slides, $n^5$, overlapped by its own flanges $n^6$. The object of the springs in front of and back of the pivot is, in all these cases, to deaden the shock which a sudden starting or stopping of the car tends to occasion—though when a capacity for lateral relative motion is especially desirable, as in the end truck of Fig. 4 and in center trucks pivoted by the construction shown in Figs. 9 and 11 without the use of the slide J and flanges $j'$, the springs just mentioned are useful as permitting the slight withdrawal of their respective rods inward, which is rendered necessary by the lateral motion of the plate $n$.

It will be observed that the pivots of the end trucks in Figs. 1 and 2 are shown as placed eccentrically in the truck-frame G—that is, at a point nearer to the center of the car body than midway between the axles of the end truck. I prefer such eccentric to central pivoting, inasmuch as thereby, when the car is traversing a horizontal curve, this eccentric pivoting shortens the arc in which the pivots N must be located, and consequently diminishes the variation from a perfect alignment with each other that must be undergone by the several trucks.

The modified form of my invention which is shown in Figs. 3 and 4 differs from the form already described mainly in the fact that its end trucks each have but two wheels, and in variations incidental to such change of construction. The main axles C of these two-wheeled trucks are journaled in the boxes $f$, in which, in the four-wheeled truck, the secondary axle would be journaled. The side bars are of course omitted. The end truck-frame G is in this case extended in a tongue, P, jointed to the truck-frame G by horizontal pivot-rods $p$ transverse to the car. The center truck-frame has similar extensions or tongues, P, at each end, which are respectively jointed to the tongues of the end trucks. This joint R is so constructed as to be extensible to a sufficient degree to allow both of the seesawing of the truck-frames G when traversing vertical curves and also of the lateral deflection of the ends of each pair of tongues when the car is traversing a curve in the horizontal plane, the position of the pivot N between the axle of the end truck and the joint R, in conjunction with the above-described or other suitable provison for lateral relative motion between the car-body and center truck, facilitating this automatic adjustment of the car to curves of the latter kind. The joint R may be made as shown, the ends of adjacent tongues being provided with segmental flanges $r$, perforated to receive a bolt, $r'$, secured therein by nuts $r^2$, and the intervening springs, $r^3$, between each nut and its flange, which springs allow of adjacent tongues slightly receding from each other when they are thrown out of line or otherwise pulled apart by a curve in the track. The perforations in the flanges $r$ are of course made conical or otherwise loose enough around the bolts to admit of the sufficient lateral play of the latter.

As to details of construction not already mentioned, it may be noticed that the lips or flanges $d$ on the ends of the side bars close around the slides $g'$ of the truck-frame G, to act as guides to assist in preserving the relative alignment of the truck-frame G and the side bars. The relative lateral motion required by the center truck may be provided for, if preferred, as shown at the center truck in Fig. 4, in which the rods $n'$, lying lengthwise of the car, bars $n^2$, through which they slide, nuts $n^3$, and springs $n^4$, resemble those of the construction shown in Fig. 9, but are connected to the car-body, not by a pivot and pivot-plate, as in the case referred to, but by links S S, pivoted to the under side of the car-body at $s\ s$, and also to the ends of a swivel-bar, S′, which is itself pivoted to the inner end of the rod n′, the links S crossing each other, so that each will connect with that end of the swivel-bar which is on the opposite side of the car from its pivot s, this construction, at least when made in the proportions shown in the drawings, giving the requisite relative lateral play to the center truck without so much longitudinal motion of the rods n′, thereby diminishing friction, and thus the urgency of the necessity for oiling the moving parts required to connect the center truck to the car-body.

T T, &c., are springs connecting the levers L with the body of the car, the object being to prevent any unnecessary undulatory motion of the system of levers and seesaw truck-frames G, such as might result from a vertical oscillation beyond the point actually required to distribute the weight of the car while traversing an uneven surface, which oscillation would be most likely to occur when abrupt obstructions (such as uneven joints between new and old rails) are encountered. The links H, it will be noticed, may be made to support their load through the interposition of springs h. The links H are jointed at each end universally—below by a staple and above by a joint partaking of the nature of both the staple and ball-and-socket joints, as shown.

The operation of the above-described mechanism may be summarized as follows: By the use of a center truck any given car will carry much more than double the load it otherwise would, inasmuch as the reducing of the span of the car-sills, between supports to one-half of their usual length, doubles their carrying capacity, while consuming a much smaller proportion of that carrying capacity in supporting their own weight. This advantage would attend the use of a center truck on a perfectly straight and level track; but on railways as they actually exist the use of a center truck without adaptation other than is usual in the case of end trucks would frequently throw the weight of the car unduly on the end trucks, as in traversing concave vertical curves, thus rendering the center truck unreliable as a support, or else on the center truck, as in traversing convex vertical curves, thus not only throwing the weight of the car unduly upon the center truck, but also, when the track is curved not only vertically but horizontally, at the same time tending to allow the car to be derailed, especially when the speed of the train is such as to crowd the flanges of the wheels against the outer rail by centrifugal force. Again, the center truck, if pivoted rigidly, as is usual in the case of end trucks, would render the car incapable of traversing an ordinary curve occurring in the horizontal plane of the track.

It is evident, therefore, that the above important advantages, which at first sight might appear to attend the use of a center truck, cannot be realized in practice without special appliances for adapting a car of this character to those peculiarities of railway-tracks which have just been noted; and the special appliances which I propose to use to overcome these difficulties are the use of the above-described arrangement of levers, (the truck-frames G being in reality levers as well as the levers L,) which distributes the weight of the car and its load with uniformity without reference to changes of relative level between the wheels, in conjunction with the use of the universally-jointed links H, rendering these automatic lateral and vertical adjustments not only entirely compatible with but independent of each other. Moreover, the use of these levers is attended with the further advantage that by throwing the support of the car-body beyond instead of directly over each truck an additional point of support for the car-body on its running-gear is gained, and the length of the car is consequently divided among a greater number of spans, thus in long cars and where the spans are equal, or nearly so, materially enhancing the advantages already enumerated as appertaining to a center-truck car.

The above remarks as to the fitness of a car provided with an arrangement of levers, as above described, for traversing vertical curves apply of course with equal force in cases where the track is from any other cause uneven—as, for example, by reason of crushed rail ends, an imperfect state of repair, &c.

It may be observed, further, that the advantages of this construction may be realized by lengthening the car-body while providing for only the ordinary load, as well as by increasing the load while retaining the ordinary length of car; or the length and load may each be increased somewhat, and indeed to a very material degree. Still another desirable feature is that, the load and length being as usual, much less weight is required to be supported by the rails, or rather those parts of them between ties, owing to the increased number of wheels, and the decrease in weight of rail thus rendered possible may of course be realized to some extent in connection with either or both of the advantages of increased load and length.

A still further advantage of the above-described arrangement of levers in a railway-car is that inequalities in the track are felt much less by passengers than when the two ends of the car are supported on trucks independent of each other, inasmuch as that point of the car-body over the center of the end truck, and which would ordinarily rise equally with said center, by the use of the above-described arrangement of levers is raised somewhat less than said center of said truck.

I am aware that in former patents a construction has been shown in which each end of the car-body is supported on a bridge or lever extending from an end truck to a center truck, and therefore I do not claim such construction broadly. In the car which I have described these intermediate levers, L, however, are themselves supported at their outer ends on other levers, G, and not directly on the wheel-frames of the end trucks. The former construction not only fails to provide additional points of support between the car-body and the rest of the car, but also subtracts from the supports of the ends of the car-body, in a sense, inasmuch as these constructions necessarily place the points of support (between the car-body and the rest of the car) nearer the center of the length of the car-body, in order to properly divide the weight between the center truck and the end trucks.

I claim as new and desire to secure by Letters Patent—

1. A car a truck of which is connected to the body of the car by links S S and a swivel-bar, S', substantially as set forth.

2. In a car, a pivot-joint between the body of the car and a truck, composed of a pivot-pin, N, a box, n, sheathing the same, rods n', bars n², and springs n⁴, whereby relative motion between the truck and the car-body in the horizontal plane is provided for, substantially as set forth.

3. A car the wheels of which are arranged in sets in three wheel-frames, wherein the end wheel-frames are capable of oscillation in the horizontal plane independently of the car-body, and the end sets of wheels are each connected to the car-body by a lever, G, one end of which lever G supports the car-body directly, and the other end of which lever G supports the car-body through the intervention of a lever, L, which is itself supported by the lever G and the central set of wheels, substantially as set forth.

4. A car upon the wheels of which are arranged three or more frames, the outer of which frames are capable of oscillation in the horizontal plane independently of the car-body, and all of which sets of wheels are equalized together by a system of levers connecting alternately with the supporting-frames and supported car-body as first-class and second-class levers, respectively, substantially as set forth.

5. In a car, a car-body supported upon wheels arranged in sets in three or more wheel-frames, the two outer of which frames are capable of oscillation in the horizontal plane independently of the car-body by the intervention of a system of levers connected together end to end, which levers alternately are supported by said sets of wheels, and, in connection with the outer ends of the outer levers, support the car-body, substantially as set forth.

6. In a car, a car-body supported upon wheels arranged in sets in three or more wheel-frames, the two outer of which frames are capable of oscillation in the horizontal plane independently of the car-body by the intervention of a system of levers, the adjacent ends of which are connected together by links, and the other ends of which are similarly connected to the car-body, which levers are alternately supported by said sets of wheels, and, in connection with the outer ends of the outer levers, support the car-body, substantially as set forth.

7. A car the wheels of which are arranged in sets in three or more frames, the outer of which frames are pivoted eccentrically, and are capable of oscillation in the horizontal plane independently of the car-body, all of which sets of wheels are equalized together by a system of levers connecting alternately with the supporting sets of wheels and supported car-body as first-class and second-class levers, respectively, substantially as set forth.

8. A car the wheels of which are arranged in sets in three or more frames, the outer of which frames are pivoted eccentrically, and are capable of oscillation in the horizontal plane independently of the car-body, all of which sets of wheels are equalized together by a system of levers, the adjacent ends of which are connected together by links, and the other ends of which are similarly connected to the car-body, and which levers connect alternately with the supporting sets of wheels and supported car-body as first-class and second-class levers, respectively, substantially as set forth.

JOHN McLACHLAN.

Witnesses:
GEO. R. CUTLER,
W. H. POPE.